United States Patent [19]

Hamaekers et al.

[11] Patent Number: 5,637,041

[45] Date of Patent: Jun. 10, 1997

[54] COUPLING WITH CONNECTED RESILIENT ELEMENT AND BEARING

[75] Inventors: Arno Hamaekers, Gorxheimertal; Andreas Olbrich, Mossautal, both of Germany

[73] Assignee: Firma Carl Freudenberg, Weinheim, Germany

[21] Appl. No.: 390,838

[22] Filed: Feb. 17, 1995

[30] Foreign Application Priority Data

Mar. 12, 1994 [DE] Germany .............. 44 08 474.9

[51] Int. Cl.⁶ .................. F16F 15/12; F16F 15/30
[52] U.S. Cl. ........................... 464/90; 474/94
[58] Field of Search ................ 464/90, 89, 94, 464/87, 92; 74/574; 474/94

[56] References Cited

U.S. PATENT DOCUMENTS

| | | | |
|---|---|---|---|
| 2,126,705 | 8/1938 | Schmidt | 464/90 X |
| 2,594,555 | 4/1952 | Hardy | 74/574 |
| 3,020,036 | 2/1962 | Kleinschmidt | 464/90 X |
| 3,509,974 | 5/1970 | Kampert et al. | 464/96 X |
| 4,558,773 | 12/1985 | Schafer | 464/90 X |
| 4,749,816 | 6/1988 | Serizawa et al. | 74/574 |
| 4,764,152 | 8/1988 | Jorg et al | 464/89 |
| 4,850,244 | 7/1989 | Eckel et al. | 464/89 X |
| 5,024,120 | 6/1991 | Andrä . | |
| 5,308,289 | 5/1994 | Funahashi | 464/180 X |
| 5,449,322 | 9/1995 | Wager | 464/90 |

FOREIGN PATENT DOCUMENTS

| | | |
|---|---|---|
| 2044094 | 12/1991 | Canada . |
| 750729 | 8/1933 | France . |
| 680988 | 9/1939 | Germany . |
| 682308 | 10/1939 | Germany . |
| 686162 | 1/1940 | Germany . |
| 691589 | 5/1940 | Germany . |
| 725651 | 9/1942 | Germany . |
| 1078822 | 9/1960 | Germany . |
| 141189 | 4/1980 | Germany . |
| 8912387 | 2/1990 | Germany . |
| 3834919 | 4/1990 | Germany . |
| 40 18 596 A1 | 12/1991 | Germany . |
| 576691 | 4/1946 | United Kingdom . |
| 644527 | 10/1950 | United Kingdom . |
| 718599 | 11/1954 | United Kingdom . |
| 919302 | 2/1963 | United Kingdom . |
| 2073370 | 10/1981 | United Kingdom . |
| 2233242 | 1/1991 | United Kingdom ............ 464/89 |

Primary Examiner—Daniel P. Stodola
Assistant Examiner—Eileen A. Dunn
Attorney, Agent, or Firm—Kenyon & Kenyon

[57] ABSTRACT

A torsionally flexible coupling having an axis of rotation, comprising a first ring and a second ring that surround one another with radial spacing, such that at least one annularly configured first resilient element made of elastomeric material is arranged in the annular gap formed by the spacing, and such that a belt pulley is mounted, with relative torsional elasticity, on at least one of the rings by a second resilient element made of elastomeric material, the belt pulley being braced at least in the radial direction against at least one of the rings by a sliding bearing. The sliding bearing is made of elastomeric material and is configured integrally and continuously with the first or second resilient element, and the sliding bearing and the first or second resilient element with which it is integrally formed are made of different materials, the materials being adapted to the respective application.

4 Claims, 1 Drawing Sheet

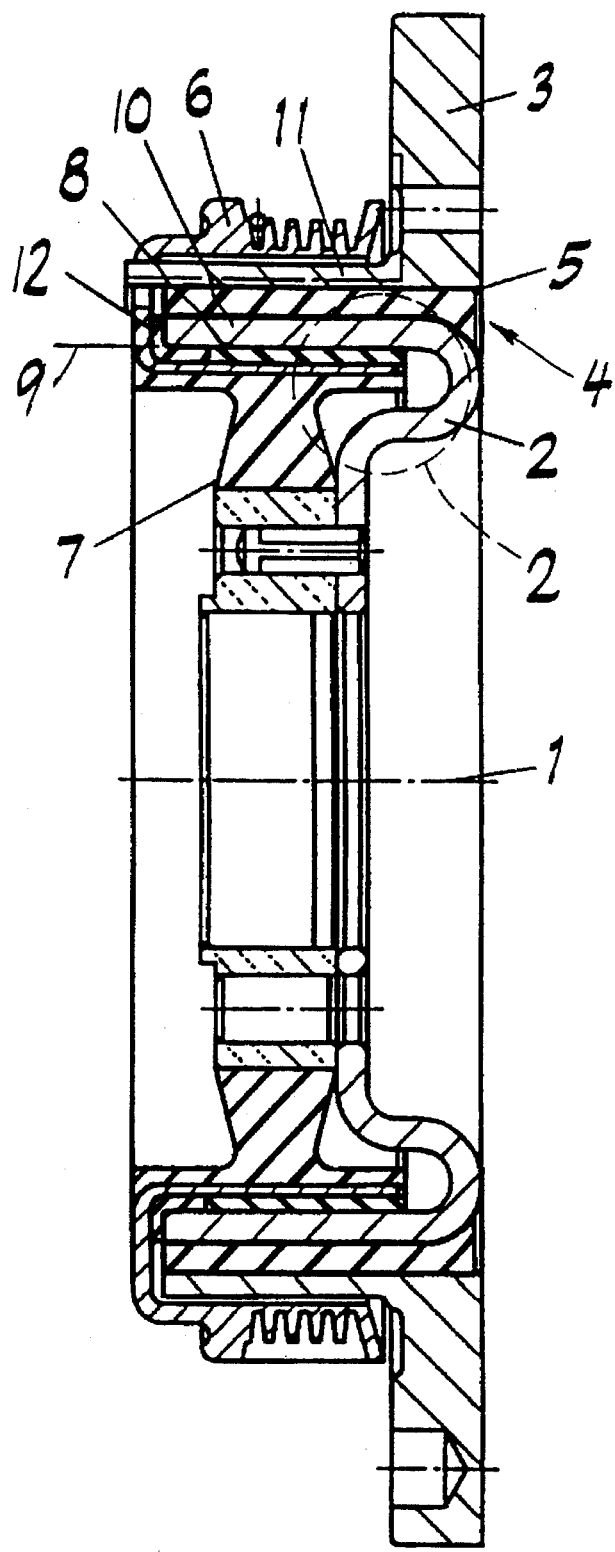
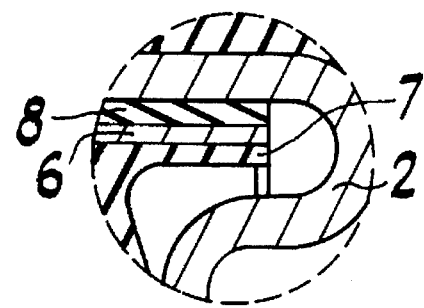
FIG. 2
FIG. 1

COUPLING WITH CONNECTED RESILIENT ELEMENT AND BEARING

BACKGROUND OF THE INVENTION

The invention relates to torsionally flexible couplings. In particular, the invention relates to torsionally flexible couplings having a rotation axis and comprising first and second rings surrounding one another in a radial direction with a radial spacing, such that at least one annular first resilient element made of elastomeric material may be arranged in the annular gap formed by the spacing. A belt pulley is mounted on at least one of the rings by a second resilient element made of elastomeric material, so that the belt pulley is mounted on the ring with relative torsional elasticity. The belt pulley is braced at least in the radial direction against at least one of the rings by a sliding bearing.

A torsionally flexible coupling of this kind is known from DE 40 18 596 A1. The torsionally flexible coupling is configured as a torsional vibration damper, with the rings being braced against each other in the radial direction by a separately produced and subsequently mounted sliding bearing. The radially nested arrangement of the rings and the belt pulley results in compact dimensions, in particular a short overall axial length of the coupling.

SUMMARY OF THE INVENTION

An object of the invention is to develop further a torsionally flexible coupling to achieve a simpler design from a production standpoint for more cost efficient production, while at the same time achieving a torsionally flexible coupling with good uniform operating characteristics.

In accordance with the invention, the sliding bearing is made of elastomeric material and is formed integrally and continuously in one piece with either the first or the second resilient element, with the sliding bearing and the resilient element with which it is integrally formed being formed of materials differing from each other, the materials being adapted to the respective application.

This construction results in simpler manufacture of the coupling, because the elastomeric parts can be vulcanized together in one operation. Because its construction entails few parts, the manufacture of the coupling is simplified, as a separately produced bearing requiring separate mounting in the coupling is unnecessary. To achieve good operating characteristics of the coupling with regard to effective damping of torsional vibrations on the one hand and a precise support of the belt pulley against one of the two rings on the other hand, the elastomeric materials used in the coupling must be adapted to the application.

In order to achieve good relative rotation between the ring which rotates with respect to the bearing and the bearing itself, the surface of that ring which is adjacent the bearing may be provided with a friction-reducing surface coating. For example, the surface coating can be a PTFE coating which is sprayed on the surface of the ring or applied as film. Alternatively, the bearing and/or the surfaces on the sides facing each other may be provided with at least one lubricant cavity filled with lubricant. For example, a grease filling can be provided. The use of a lubricant markedly reduces the coefficient of friction between the two parts, and, in this manner, the abrasion resistance of the bearing is substantially improved.

According to one arrangement, the bearing can be located in a position on the inner side of the first ring and braced against the belt pulley so as to allow relative rotation.

The belt pulley can have a U-shaped profile open in an axial direction and can surround axial projections of the first and second rings. Such an arrangement results in the resilient elements and the sliding bearing being arranged essentially within a common radial plane. Because of this, the coupling can be protected in a particularly favorable manner from axial forces during normal operational use. The axially overlapping arrangement of the resilient elements and the sliding bearing results in compact dimensions of the coupling in the axial direction.

To improve the bracing of the rings and the belt pulley relative to each other in axial direction, the sliding bearing can be joined integrally and continuously with an axial sliding bearing, which axial sliding bearing is arranged under axial prestressing between the end of the axial projection of the first ring and the bottom of the U-shaped belt pulley. Preferably, the axial sliding bearing is formed in one piece with the primary sliding bearing.

To improve the fixation of the sliding bearing to the integrally formed adjacent resilient element, the axial projection which is bounded by the resilient element on one side and the premolded sliding bearing on the other side can have openings which extend essentially in the radial direction and which are penetrated by the elastomeric material of the journal bearing and/or the adjoining resilient element. In this manner, a positive fixing of the elastomer to the axial projection results. The durability of the coupling is thereby increased.

BRIEF DESCRIPTION OF THE DRAWING

FIG. 1 shows an exemplary embodiment of a torsionally flexible coupling according to the invention.

FIG. 2 is an enlarged view of the portion of FIG. 1 designated by the circle A.

DETAILED DESCRIPTION OF THE DRAWINGS

In the illustrated embodiment, a torsionally flexible coupling is shown that comprises a first ring 2 and a second ring 3 which encircle a common axis of rotation 1 and which are concentrically aligned with radial clearance 4 between them. The first ring 2 is formed as a cup-shaped hub ring and is encircled on its outer peripheral side by the second ring 3, which constitutes the rotating ring. Between the first ring 2 and the second ring 3, a first resilient element 5 is arranged, which adhesively joins the two rings 2, 3 to each other.

The coupling includes a belt pulley 6 having a U-shaped profile open in an axial direction. Axial projections 10, 11 of the first and second rings 2, 3 project within the open space of the U-shaped belt pulley 6. The belt pulley 6 is braced by a second resilient element 7, which extends essentially in a radial direction and which is secured on the first ring 2 in a torsionally flexible manner. In order to assure a good guidance of the belt pulley 6 and to reliably prevent wobbling, the belt pulley 6 is supported on the inside on the side facing away from the second elastic spring element 7 by a sliding bearing 8 against the inside of the cup-shaped first ring 2. In order to achieve good relative rotation between the first ring 2 and the bearing 8, the surface 9 of the first ring 2 which is adjacent the bearing 8 may be provided with a friction-reducing surface coating.

As shown in FIG. 2, the sliding bearing 8 and the second resilient element 7 are configured integrally and continuously with one another and consist of elastomeric materials differing from each other. The second resilient element 7 has a relatively greater flexibility, while the bearing 8 is designed to be comparatively harder in order to avoid abrasive wear. The bearing 8 is joined integrally and continuously with an axial sliding bearing 12, which axial sliding bearing is arranged under axial prestressing between the end of the axial projection 10 of the first ring 2 and the bottom of the belt pulley 6.

What is claimed is:

1. A torsionally flexible coupling having an axis of rotation, comprising:

a first ring and a second ring, one of the rings surrounding the other with radial clearance, and an annular gap formed by the radial clearance between the first ring and the second ring;

at least one annular first resilient element made of elastomeric material arranged in the annular gap;

a belt pulley mounted, with relative torsional elasticity, on one of the first and second rings by a second resilient element made of elastomeric material; and a sliding bearing bracing the belt pulley against one of the rings at least in the radial direction;

wherein the sliding bearing is made of elastomeric material and is configured in one piece with one of the first and second resilient elements; and wherein the sliding bearing and the one resilient element with which it is configured in one piece are made of different materials.

2. A coupling according to claim 1, wherein the surface of the ring facing the sliding bearing for relative rotation has a friction-reducing surface coating.

3. A coupling according to claim 1, wherein the belt pulley has a U-shaped profile having two legs and a bottom defining an open space, wherein the U-shaped profile is open in an axial direction, and wherein axial projections of the first and second rings project within the open space of the U-shaped belt pulley.

4. A coupling according to claim 3, wherein the sliding bearing is joined integrally and continuously with an axial sliding bearing which is arranged between the end of the axial projection of the first ring and the bottom of the belt pulley.

* * * * *